No. 707,607. Patented Aug. 26, 1902.
M. E. LOWELL.
SHIP'S STEERING APPARATUS.
(Application filed Jan. 17, 1902.)

(No Model.) 2 Sheets—Sheet 1.

Witnesses:
Charles F. Logan.
Charles A. Harris.

Inventor:
Maurice E. Lowell.
by Alban Andrew
his Atty.

No. 707,607. Patented Aug. 26, 1902.
M. E. LOWELL.
SHIP'S STEERING APPARATUS.
(Application filed Jan. 17, 1902.)

(No Model.) 2 Sheets—Sheet 2.

Witnesses:
Charles F. Logan
Charles A. Harris

Inventor:
Maurice E. Lowell,
by [signature]
his Atty.

UNITED STATES PATENT OFFICE.

MAURICE E. LOWELL, OF BEVERLY, MASSACHUSETTS.

SHIP'S STEERING APPARATUS.

SPECIFICATION forming part of Letters Patent No. 707,607, dated August 26, 1902.

Application filed January 17, 1902. Serial No. 90,206. (No model.)

*To all whom it may concern:*

Be it known that I, MAURICE E. LOWELL, a citizen of the United States, and a resident of Beverly, in the county of Essex and State of Massachusetts, have invented certain new and useful Improvements in Ships' Steering Apparatus, of which the following is a specification.

This invention relates to improvements in ships' steering apparatus, and it is carried out as follows, reference being had to the accompanying drawings, wherein—

Figure 1:
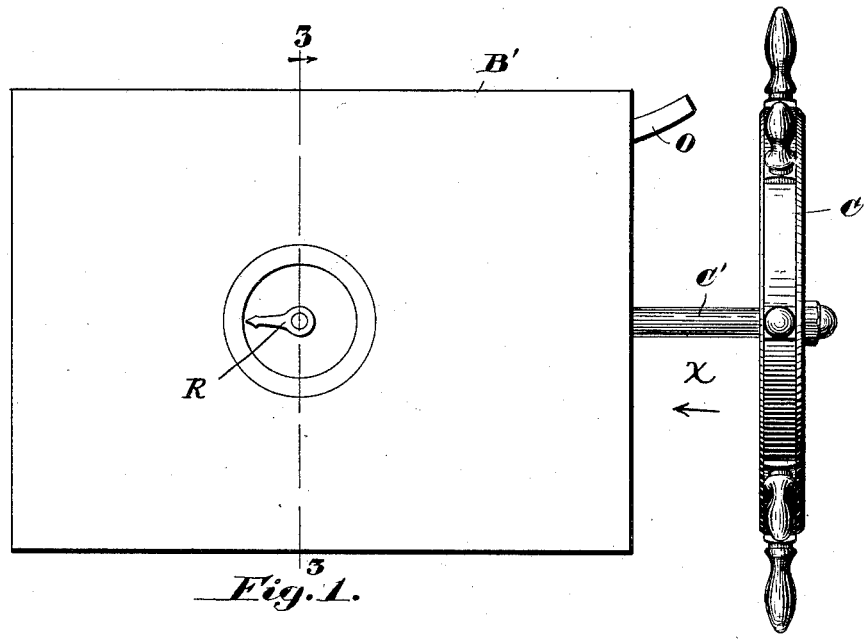
Figure 2:
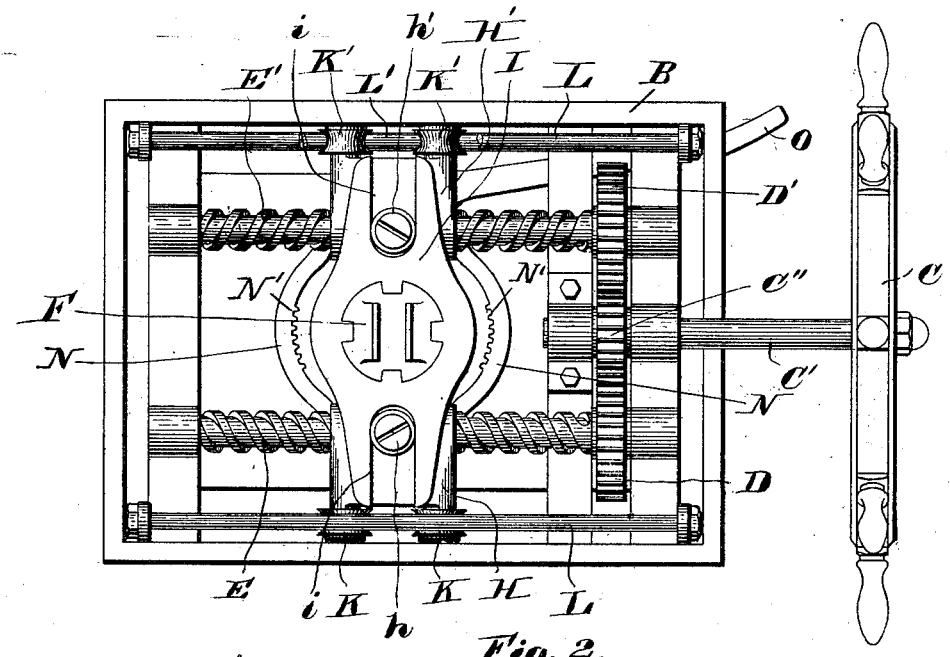
Figure 3:
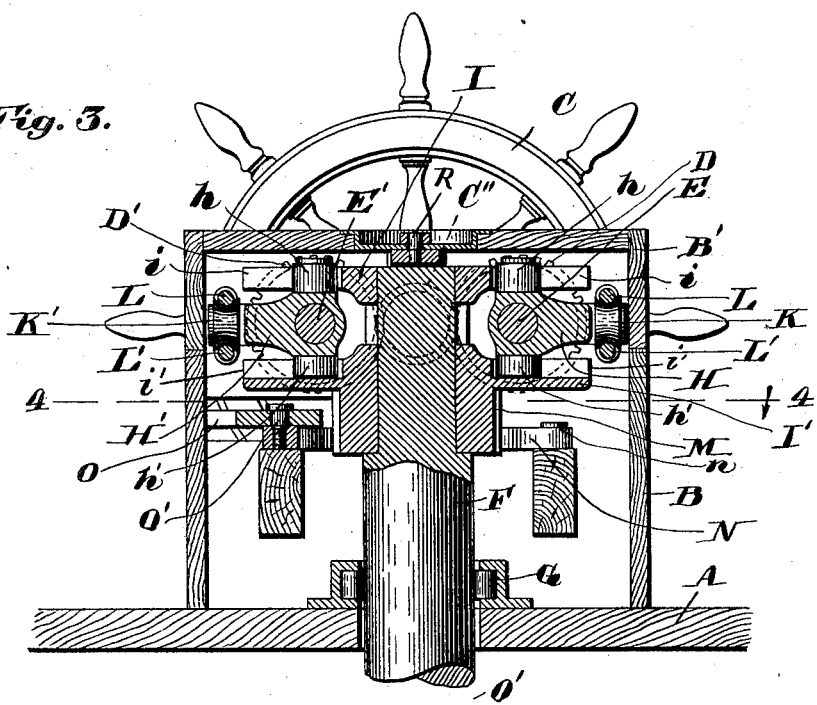
Figure 4:
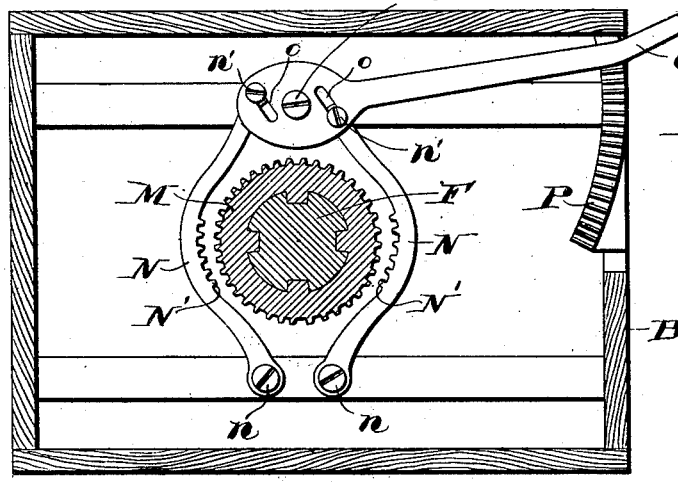
Figure 5:
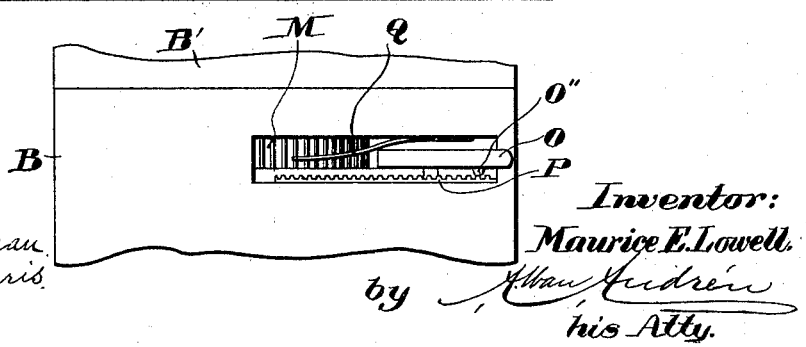

Figure 1 is a top plan of the invention. Fig. 2 is a similar view showing the cover of the wheel-box removed. Fig. 3 is a cross-section on the line 3 3 shown in Fig. 1. Fig. 4 is a horizontal section on the line 4 4 shown in Fig. 3; and Fig. 5 is a detail end view seen from X in Fig. 1, showing the locking device of the brake for temporarily securing the rudder-post in position.

Similar letters refer to similar parts wherever they occur on the different parts of the drawings.

In the drawings, A represents the deck of a vessel, to which is secured in a suitable manner the wheel-box B, provided with a detachable cover B', as shown.

C represents the wheel, secured to the wheel-shaft C', which is journaled in suitable bearings secured to the box B, as usual. To the shaft C is secured a pinion C'', the teeth of which mesh in the teeth of the spur-gears D D', secured to the screw-shafts E E', the ends of which are journaled in the box B, as shown. One of said screw-shafts is provided with a right-hand screw and the other with a left-hand screw, as shown in Fig. 2.

F is the rudder-post, extending up through a perforation in the deck A, and in practice I prefer to journal such rudder-post in an antifriction roller-bearing G, as shown in Fig. 3.

H H' are screw-threaded nuts or sleeves engaging the right and left screw-shafts E E', each of which nuts is provided on its upper and under side with pins or pins and rolls $h$ $h'$, projecting into the forked ends $i$ $i'$ of the cross-heads I I', secured to the rudder-post F above and below said screw-threaded sleeves or nuts H H', as shown. Upon the outer sides of the nuts H H' are arranged studs or pins, upon which are loosely journaled preferably grooved guide-rollers K K', which engage parallel guide-rods L L L' L', arranged in pairs above and below said guide-rollers, as shown in Figs. 2 and 3. Said guide-rods are preferably cylindrical in section and are secured at their ends in a suitable manner to the ends of the wheel-box, as shown. By the arrangement of forked cross-heads I I' above and below the threaded nuts or sleeves H H' and pins or pins and rolls on the latter engaging the said forked upper and lower cross-heads the said nuts are caused to travel in true alinement relative to the screw-shafts E E' and prevented from binding thereon and causing undue frictional resistance during the rotation of said screw-shafts. The guide-rollers K K' serve, in connection with the guide-rods L L', to guide the nuts H H' in linear directions during the rotation of the steering-wheel with a minimum of frictional resistance.

While the vessel is at anchor, or whenever it is desirable to lock the rudder-post in a fixed position, I use a locking device, as follows: Preferably integral with the lower cross-head I' is made a serrated or toothed ring M, secured to the rudder-post, and in connection with such cog-ring M, I use a pair of locking-levers N N, pivoted at $n$ $n$ within the wheel-box B and provided on their interior portions with toothed or serrated segments N' N', adapted to be interlocked with the toothed ring M when said levers N N are moved toward each other. The free ends of said levers N N are provided with pins or projections $n'$ $n'$, movable in inclined perforations $o$ $o$ in the brake-lever O, which is pivoted at O', as shown in Fig. 4, and has its free end projecting forward through an opening in the forward end of the wheel-box, as shown.

O'' is a tooth or projection on the under side of the forward end of the lever O, which is adapted to be interlocked in a toothed rack or segment P, secured to the wheel-box, as shown.

Q is a suitable yielding spring secured to the wheel-box for the purpose of holding the lever O in engagement with the toothed rack P when the segments N' N' are held interlocked with the toothed ring M. It will thus be seen that by adjusting the position of the lever O the levers N N are caused to be connected and disconnected to and from the toothed ring M, as may be desired, for the purpose set forth. For the purpose of indicating the position of the rudder during the adjustment of the wheel and wheel-shaft I employ an indicator R, journaled in the cover B' and having its lower end detachably connected in a suitable manner to the upper end of the rudder-post, as shown in Figs. 1 and 3.

What I wish to secure by Letters Patent and claim is—

1. In a ship's steering apparatus, a rudder-post having secured to it a toothed ring M, in combination with pivoted levers N, N, having toothed inner surfaces adapted to be interlocked with said toothed ring, a pivoted brake-lever O, connected to the levers N, N, as described and means for adjusting and securing said brake-lever in position substantially as and for the purpose set forth.

2. In a ship's steering apparatus, a rudder-post, a wheel-box inclosing the same and a removable cover combined with a rudder-indicator journaled in said cover and detachably connected to the rudder-post substantially as and for the purpose set forth.

In testimony whereof I have affixed my signature in presence of two witnesses.

MAURICE E. LOWELL.

Witnesses:
ALBAN ANDRÉN,
THEKLA ANDRÉN.